United States Patent Office 3,563,006
Patented Feb. 16, 1971

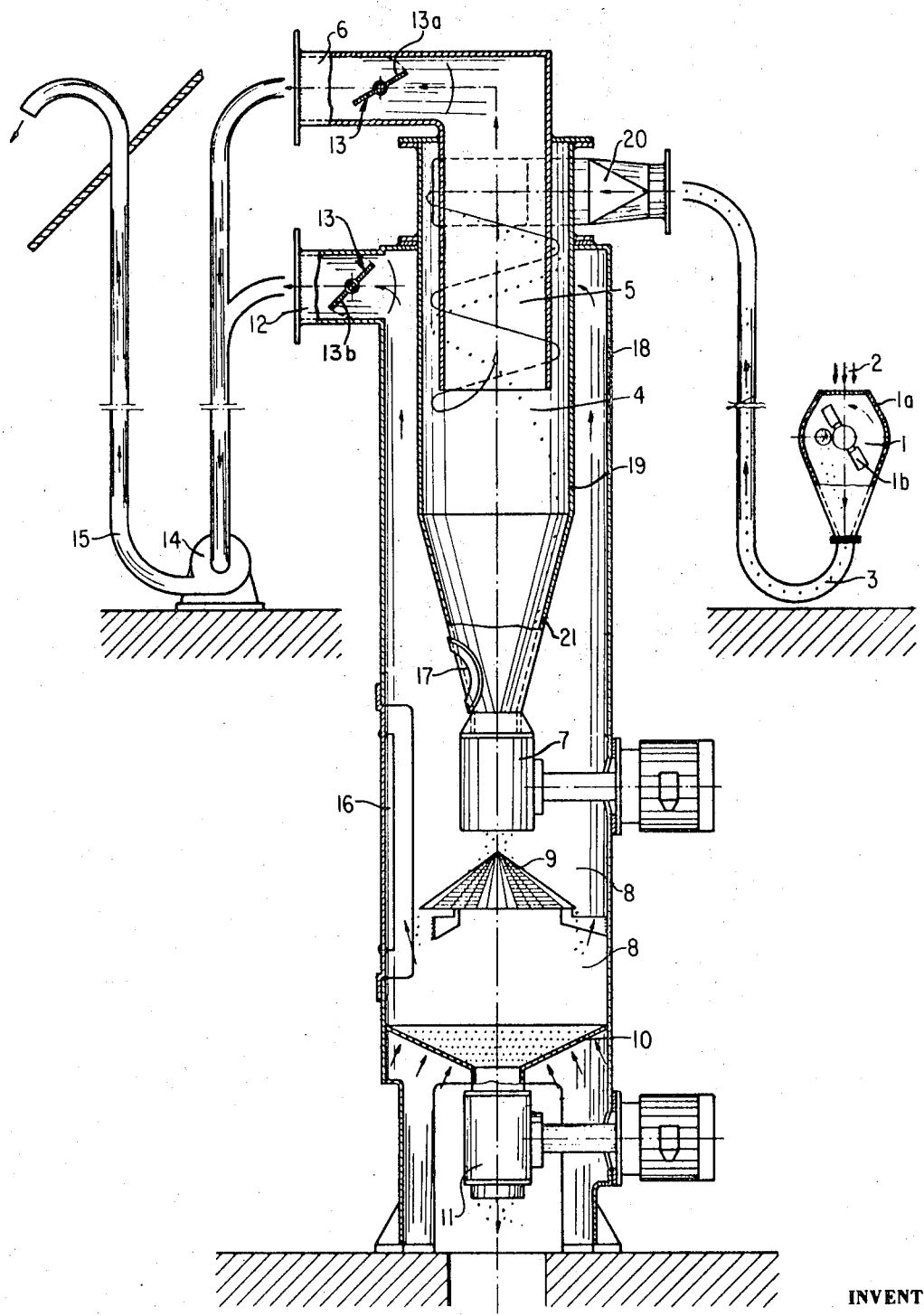

3,563,006
SEPARATING AND COOLING DEVICE FOR
PLASTIC GRANULES
Fritz Sutter, Pratteln, Switzerland, assignor to Buss Aktiengesellschaft, Basel, Switzerland, a corporation of Switzerland
Filed June 19, 1968, Ser. No. 738,233
Claims priority, application Switzerland, June 22, 1967, 9,122/67
Int. Cl. B01d 51/00
U.S. Cl. 55—267
4 Claims

ABSTRACT OF THE DISCLOSURE

A separating and cooling device for producing cooled plastic granules comprising a cylindrical casing with distributing members and air cooling access means arranged in its lower end, a second smaller cylindrical casing within said first casing and coaxially arranged therewith, and a third still smaller cylindrical casing within said second casing, the third casing being provided with an outlet collar.

---

The present invention concerns a separating and cooling device for producing cooled plastic granules, the device having a cylindrical casing with distributing members and air cooling access means arranged in its lower end, a second smaller cylindrical casing within the first casing and coaxially arranged therewith, and a third still smaller cylindrical casing within said second casing which is provided with an outlet collar.

Plastic granules which are formed immediately after cutting in a conventional vessel are hot, viscous, sticky and soft so as to cause a compact agglomeration which quickly builds up and firmly adheres to the walls of the conventional vessel. It is necessary to dry and cool the granules at their surface so that they are no longer soft and viscous.

An object of the present invention is to provide novel apparatus means of apparatus for cooling and collecting the freshly cut granules, and for carrying away the granules in a closed system of pipes by means of a flow of air, which serves to cool the cut granules.

At the output of the apparatus the granules are neither viscous nor warm at the surface, and the granules behave in the same way as immediately after the cutting. Due to the low heat conduction of the plastics granules the heat, which remains in the interior of each granule, gradually distributes itself over the whole of each grain so that the surface of the latter again becomes viscous and warm. This creates a further problem which is solved by the present invention.

In prior attempts to solve this problem the granules are spread on large sieve surfaces, which requires a large work space and setting up a cooling device which likewise takes up a lot of space.

The object of the present invention is to provide a separating and cooling device in which the above mentioned disadvantage is removed or substantially reduced.

According to the present invention there is provided a separating and cooling device for plastic granules, which has a cylindrical casing with distributing members and air cooling medium access arranged in the lower end, as well as a smaller cylindrical casing having a conical lower end piece arranged co-axially within said first casing, said smaller cylindrical casing having therewithin yet a further cylindrical casing with an outlet collar, said conical end piece entering into a separating member.

This device makes it possible to build a machine which takes up only the space needed for the separator, but cools at the same time, without needing additional equipment and work.

The invention will now be described further, by way of example only, with reference to the accompanying schematic drawing.

A cutting device 1 is shown simplified and reduced in size. A bladed wheel 1b rotates in a collecting casing 1a and cuts the product entering therein into granules. A strong stream of air, indicated by the arrows 2, is drawn from above into the collecting case 1a, which cools the granulate on the surface and at the same time carries it through a pipe 3 into the cyclone separator 4 via an inlet collar 20. The separator 4 consists of a cylindrical casing 19 having a conical lower end piece 21 as well as a central pipe 5 which is arranged co-axially in the cylindrical casing 19 and has an outlet neck 6 at its upper end. The pipe 3 enters tangentially into the casing 19 of the separator 4 so that the air first of all flows downwardly in a helically shaped path and then rises upwardly again in the central pipe 5 where it passes out of the separator through the outlet neck 6. The granulate which is taken along with the air stream first of all goes with it along the helical path, but then falls and settles downwardly into a separator in the form of sluice 7 which continuously carries the granulate away and at the same time serves as an airlock against the cyclone. The granulate thereafter falls into the cooling chamber 8 where it is first distributed into the vicinity of the outer wall by a distributing cone 9. It then falls onto a cooling cone 10 which has a large number of perforations of, for example, one millimeter in diameter, through which air is drawn. This stream of air cools the granulate which may extend as far as the distributing cone 9 and is cooled to a greater or lesser extent according to the depth of the layer, or the average length of time in the chamber may vary. The level of filling can be regulated with sluice 11. The granulate may also be caused to whirl violently by passing a stronger current of air, which is of particular advantage for certain products. The granulate discharged is thus carried away by a conveyor plant (not shown) into a silo.

The air which is passed through the cooling cone 10, flows upwardly and takes away the heat of the granulate finally to leave an outer casing 18 through an outlet collar 12. The flow of air in both systems is regulated by a plurality of control flaps 13, there being a first control flap 13a in outlet 6 and a second control flap 13b in outlet 12. The air from the two outlets 6 and 12 is fed in common to a fan 14, which produces the necessary suction and forces the air outwardly through a pipe 15.

The outer wall of the cooling chamber 8 has a large door 16 for cleaning the plant. Both the door 16 and a window 17 in the separator are partly transparent so that the processes in the device can be monitored during operation.

What I claim is:
1. A device comprising a cutting device (1) which includes a rotating wheel means for cutting solid plastic into granules, means (3, 20) for conveying said granules by a stream of air into a separating and cooling device, said separating and cooling device comprising:
   a first cylindrical casing (18) with an inlet (20, 19, 7) and an outlet (12) having a control flap (13b) therein, said first cylindrical casing having at its lower end a distributing member (9) in the form of a distributing cone and air cooling access means (10) in the form of a cooling cone having a large number of perforations of the order of 1 millimeter in diameter through which air is drawn;
   a second cylindrical casing (19) which is smaller than said first casing (18) and which has a frusto-conical lower end piece (21), both said second casing and said end piece being arranged coaxially with said first casing, said first casing surrounding all of said end piece and at least a substantial portion of said second casing, said second casing having a tangential inlet fluidly communicating with said means for conveying;

a separator sluice (7) beneath said frusto-conical end piece;

a cylindrical pipe (5) coaxial with and at least partially within said second casing (19), said pipe and said second casing defining an annular space therebetween, said cylindrical pipe having an inlet opening at its bottom through which air passes upwardly to exit from the top, said cylindrical pipe further having a right angle portion at the top which extends out of and away from said second casing into fluid communication with suction means (14, 15) for drawing air through said pipe, said outlet being provided with a control flap (13a) to control the flow of air through said outlet;

said conical end piece (21) of said second casing fluidly communicating with said separator sluice (7) in such a manner that cooled granules passing through said second casing pass through said conical section and through said separator sluice and fall onto said distributing member (9) and then into the bottom of said first casing (18);

suction means being (14, 15) in fluid communication with the outlet (12) of said first casing (18) and with the outlet (5) of said second casing (19);

a sluice means (11) fluidly communicating with said first casing and being disposed coaxially with both said first casing and said cooling cone for removing cooled granular material from the bottom of said first casing.

2. A device as defined in claim 1 including perforations in said distributing cone.

3. A device as defined in claim 1 including a door (16) opposite member (9).

4. A device in claim 3 wherein said door (16) is partly transparent.

References Cited

UNITED STATES PATENTS

| 2,703,936 | 3/1955 | Hut | 34—168 |
| 2,571,380 | 10/1951 | Penick | (34—10UX) |
| 3,092,471 | 6/1963 | Stromeyer | 34—57X |
| 3,293,771 | 12/1966 | Lawrence et al. | 34—57(T) |
| 3,367,034 | 2/1968 | Good | 34—10 |
| 3,383,774 | 5/1968 | Austin | 34—57(A) |

FOREIGN PATENTS

| 601,389 | 5/1948 | Great Britain | 34—57 |
| 981,605 | 1/1965 | Great Britain | 34—168 |

DENNIS E. TALBERT, Jr., Primary Examiner

U.S. Cl. X.R.

55—385, 417, 432, 459; 241—65, 301